Dec. 12, 1933. R. P. LANSING Re. 19,020

ENGINE STARTER

Original Filed Sept. 27, 1926 4 Sheets-Sheet 1

Witness
Martin H. Olsen

Inventor
Raymond P. Lansing
By Rector Hibben Davis & Macauley
His Attys

Dec. 12, 1933. R. P. LANSING Re. 19,020

ENGINE STARTER

Original Filed Sept. 27, 1926 4 Sheets-Sheet 2

Witness
Martin H. Olsen.

Inventor
Raymond P. Lansing
By Rector, Hibben, Davis & Macauley
His Attys.

Dec. 12, 1933. R. P. LANSING Re. 19,020

ENGINE STARTER

Original Filed Sept. 27, 1926 4 Sheets-Sheet 3

Witness
Martin H. Olsen.

Inventor
Raymond P. Lansing
By Rector, Hibben, Davis & Macaulay
Their Attys.

Dec. 12, 1933. R. P. LANSING Re. 19,020
ENGINE STARTER
Original Filed Sept. 27 1926 4 Sheets-Sheet 4
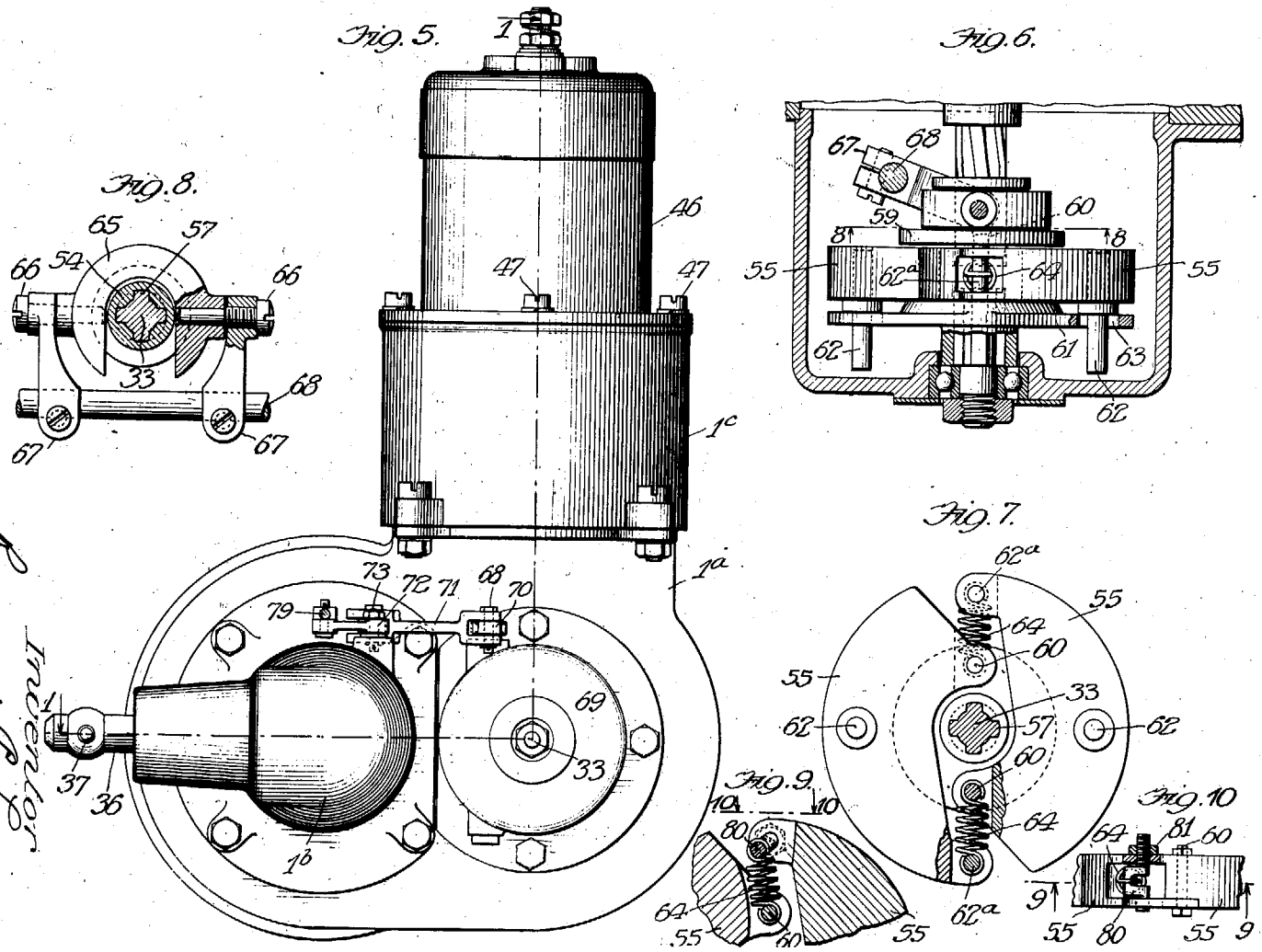
Witness
Martin H. Olsen
Inventor
Raymond P. Lansing
By Rector, Hibben, Davis & Macauley
His Attys.

Reissued Dec. 12, 1933

Re. 19,020

UNITED STATES PATENT OFFICE 19,020

ENGINE STARTER

Raymond P. Lansing, Montclair, N. J., assignor to Eclipse Machine Company, Elmira, N. Y., a corporation of New York Original No. 1,778,900, dated October 21, 1930, Serial No. 137,866, September 27, 1926. Application for reissue October 11, 1932. Serial No. 637,359

22 Claims. (Cl. 123—179)

My invention relates to engine starting apparatus for the starting of internal combustion engines and more particularly but not necessarily airplane engines, and the object thereof is to provide a simple, efficient and reliable apparatus of this character for either power or manual operation and characterized by the provision in the drive or transmission proper of a driving member or element adapted to be automatically engaged with a member of the engine to be started by novel and efficient means combined with and controlled by the actuating means for said drive, whereby when a predetermined speed of the apparatus and its inertia means or flywheel is reached, such driving member will be automatically moved into engagement with the engine member and the engine thereby cranked.

Figures 1, 11:
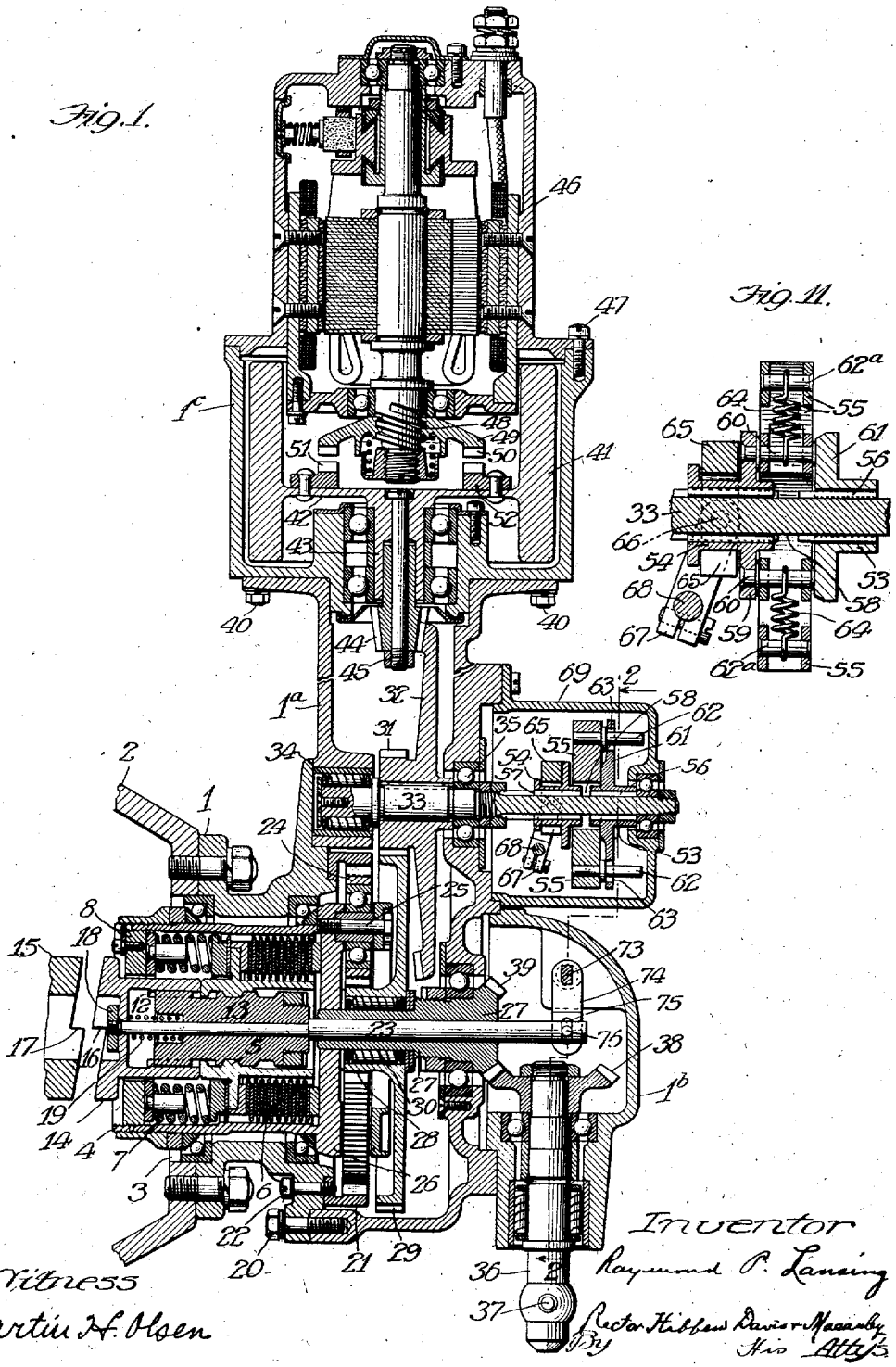
Figure 2:
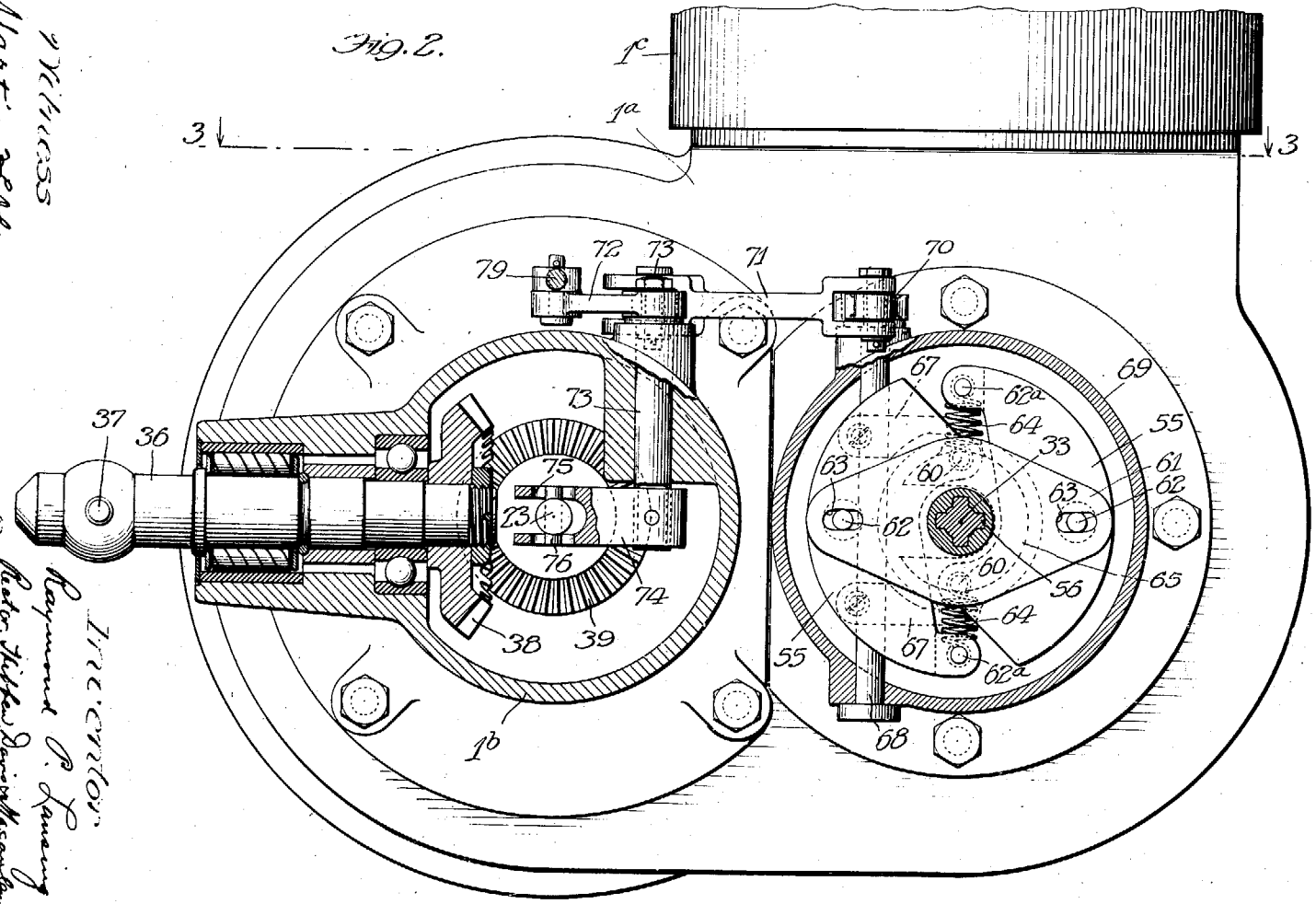
Figure 3:
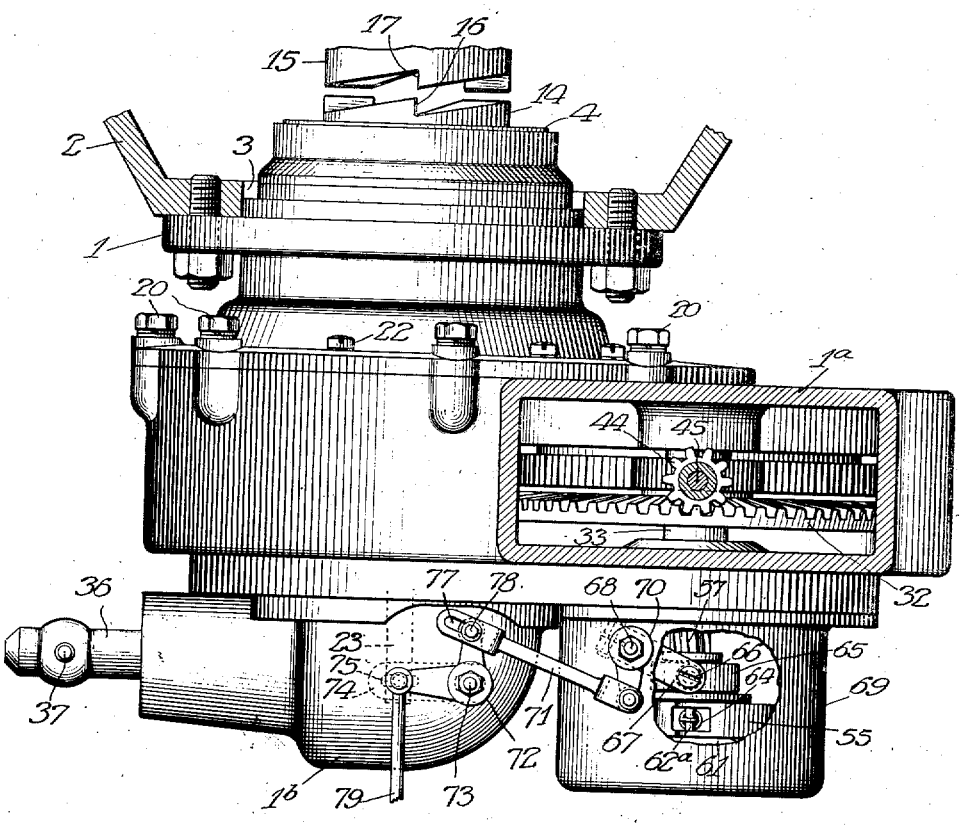
Figure 4:
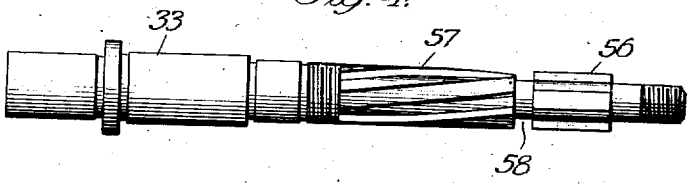

In the drawings, Figure 1 is a section taken on the irregular line 1—1 of Fig. 5 and illustrating an apparatus embodying my invention; Fig. 2 a section on the line 2—2 of Fig. 1 but on a larger scale; Fig. 3 a sectional plan view on the line 3—3 of Fig. 2; Fig. 4 is a detailed view of the governor shaft; Fig. 5 an end elevation of the apparatus; Fig. 6 a top plan view partly in section of the governor machanism; Fig. 7 an elevation of the flyweights; Fig. 8 a sectional elevation on the line 8—8 of Fig. 6; Fig. 9 a detailed section on the line 9—9 of Fig. 10; Fig. 10 a detailed plan on the line 10—10 of Fig. 9; and Fig. 11 a detail view of the mounting of the flyweights.

First describing the drive or transmission portion of the apparatus the same includes the drive proper and the actuating mechanism therefore including the reduction gearing and an inertia means such as a flywheel, which mechanism is operated by either manual means or power means such as an electric motor either independently or conjointly. The drive is located within a main casing 1 which is suitably supported as by being detachably connected with the crank case 2 of the engine, a small portion of which is illustrated, within a circular opening 3. In this opening there rotates a driving barrel 4 and a nut 5 concentrically arranged therewithin and providing an annular space to receive a yieldable drive connection which is here in the form of a friction clutch 6. This clutch is composed of two sets of plates or disks which are splined respectively to the interior of the barrel and the exterior of the nut. The proper pressure for the disks is provided by a series of springs 7 located in such annular space, and such pressure is regulated by the adjustable nut 8 screwing into the outer end of the barrel. The thrust of these springs tends to force the nut outwardly whereby the disks are forced together according to the pressure of said springs.

The nut 5 is provided with internal long lead screw threads within which is threaded the driving member here comprising an externally threaded shaft 13 and a clutch member 14 mounted on the front end of such shaft in such manner as to be rotated thereby and to have a relative longitudinal movement with respect thereto as by means of splines 12. The clutch member is adapted to engage a rotatable member on the engine to be started such as the clutch member 15, said clutch members having inclined clutch teeth 16 and 17 which engage in the cranking operation and which are adapted to be automatically disengaged by reason of the inclined formation of such teeth and also by reason of the screw action between the shaft 13 and the nut 5. A rod 23 extends centrally through the drive and through the reduction gearing hereinafter described, and particularly passes centrally through the screw shaft 13 and its clutch member 14, the same terminating in a nut 18 screwing on to the outer end of such rod and limiting the outward relative movement of such clutch member 14 as is caused by the spiral spring 19.

Describing the reduction means, the same consists of gearing which is contained within a second casing $1^a$ which is secured to the main casing 1 as by means of screws 20 and in which such gearing is supported and in which it has its bearings. A main stationary internal gear 21 is secured by screws 22 to the casing 1 and with the same there meshes a series of three planetary pinions 24 which are journaled by means of studs 25 to the end plate 26 of the driving barrel 4, which practically closes the inner end of such barrel except for the center opening through which the rod 23 and the central driving shaft 27 extend. These pinions 24 mesh with a central pinion 28 which as shown, is formed as a part of the hub of a large gear 29 mounted to rotate freely upon the shaft 27 to the medium of an antifriction bearing 30. This gear 29 in turn meshes with a pinion 31 here formed as a part of the hub of a large bevel gear 32 which is secured to a cross shaft 33 having bearings 34 and 35 in two opposite walls of the casing $1^a$. The right hand end of this shaft 33 is extended and the same is part of the apparatus utilized for cooperation with the governor mechanism hereinafter described, although it will be understood that some other rotating part of the apparatus may be utilized for this purpose including the inertia means or flywheel.

Describing the manual means the same includes a cranking shaft 36 journaled in a casing $1^b$ secured in suitable manner to the casing $1^a$ and extending therefrom and provided near its outer end with pins 37 to receive an ordinary hand crank. This cranking shaft is provided at its inner end with a bevel pinion 38 which meshes with a corresponding bevel pinion 39, here formed as a part of the central shaft 27.

Next describing the inertia means the same comprises a flywheel and operating connections with a bevel gear 32 and with the prime mover, such inertia means being contained within and supported by a casing $1^c$ in suitable manner as by means of screws 40. The flywheel comprises a ring 41 having the predetermined or desired mass or weight, web 42 and a depending hub 43. This hub has its bearings in the bottom plate of the casing $1^c$ and is drivingly secured as by splining to the hub of a bevel pinion 44 which meshes with the bevel gear 32. This pinion 44 and hub 43 are held together in assembled position by the bolt 45.

The prime mover which is here an electric motor 46 is secured to the casing $1^c$ in suitable manner, as by screws 47 and the same has an extended armature shaft provided with a screw threaded portion 48. Upon such portion there is threaded a nut 49 provided with clutch jaws 50 adapted to engage corresponding clutch jaws 51 cooperating with the flywheel and here shown as a part of a ring 52 secured to the web 42 of the flywheel.

In so far as my present invention is concerned, the particular construction of the reduction gearing and the manual means and the power means is immaterial, but the construction described is very practical and useful for the purpose intended particularly with respect to the governor mechanism now to be described.

The governor mechanism which controls the engagement of the driving member with the engine member cooperates with and is driven by the shaft 33 of the reduction gearing in the present instance, the same affording in this construction of apparatus a suitable and efficient point of application for such governor. This governor is of the speed responsive type and is adapted to shift the rod 23 and consequently the driving member into engagement position when the speed of the apparatus (that is, of the shaft 33 and consequently of the flywheel) reaches a predetermined degree.

Referring to the construction of governor herein illustrated the same includes two sleeves 53 and 54 and a pair of interposed flyweights 55, which sleeves are mounted upon the peculiarly formed extension of the shaft 33 which is shown in detail in Fig. 4. This shaft is provided near its outer end with a straight spline portion 56 and an intermediate spiral splined portion 57 such portions being separated by an undercut 58. The sleeve 53 is mounted upon the straight spline portion 56 for rotation with shaft 33 and the other sleeve 54 is mounted on the spirally splined portion 57 for rotation with such shaft and for longitudinal movement thereon. The flyweights 55 are operatively connected to the flange 59 of the sleeve 54 by being pivotally mounted upon pins or rivets 60 extending laterally from such flange 59. These flyweights are operatively connected with the flange 61 of the sleeve 53 by means of laterally projecting pins 62 carried by such flyweights and extending laterally therefrom and through elongated openings 63 in such flange 61. The construction and arrangement of these parts is such, as hereinafter explained, that when the speed of the apparatus reaches a predetermined degree the flyweights will move outwardly by centrifugal force and cause angular displacement between the sleeves 53 and 54 and thereby cause longitudinal travel of the sleeves 54 to the left (Fig. 1). The flyweights are held in their center position by the two coil springs 64 which are here shown as connected at their opposite ends with the pins 60 and $62^a$ The governor is operatively connected with the rod 23 by a set of suitable connections which in the present instance are as follows: The sleeve 54 is recessed to receive a shifter yoke 65 to which is secured by the screws 66 a pair of depending arms 67 connected at their lower ends with a rock shaft 68 which is journaled in the casing 69 enclosing the governor mechanism. This rock shaft 68 extends extraneous of the casing 69 and is provided at its outer end with a crank arm 70. The linkage between this crank arm and the rod 23 consists of a link 71, bell crank 72, rock shaft 73 and lever arm 74 whose lower end has a pin and slot connection with the inner or right hand end of the rod 23 (Fig. 1) there being a longitudinal slot 75 in such arm and a pin 76 through the rod 23. As shown in Fig. 3 the link 71 has at one end a longitudinal slot 77 in which travels the stud 78 in one arm of the bell crank 72 in order to provide lost motion between such link and the bell crank in the initial movement of the governor mechanism, to the end that while the governor mechanism will throw the driving member into engagement with the engine member the retraction of the linkage of such mechanism as the speed of the inertia means or flywheel falls will not disengage the driving member from its engagement thus permitting the apparatus to crank the engine until nearly all the energy in the flywheel has been dissipated.

By preference provision is made for manual engagement of the driving member irrespective and independently of the governor mechanism and for this purpose the manually operated rod 79 is connected to the bell crank 72. When this rod 79 is moved inwardly the rock shaft 73 will be rocked and the rod 23 will be shifted outwardly, that is in a direction for meshing the driving member with the engine member. In this operation the governor mechanism does not interfere with the manual operation because the sleeve 54 can in such operation be moved longitudinally along its spiral splines 57.

Describing a cycle of operation of the apparatus and starting first with the utilization of the power means or electric motor as the source of energy, and with the parts in their normal position as shown in Fig. 1, in which the clutch elements 16 and 17 are disengaged, when the motor is energized the nut 49 will be automatically advanced to bring the clutch jaws 50 and 51 into driving engagement to establish driving relation between the electric motor and the flywheel. The flywheel will thereupon be rapidly rotated and the reduction gearing and associated mechanism will be rotated but comparatively slowly according to the degree of reduction. Likewise the governor mechanism will be rotated and, as it attains increasing speed its sleeve 54 shifts leftwardly (Fig. 1). When the R. P. M. of the flywheel reaches a predetermined degree, the governor mechanism operates to cause the final increment of longitudinal movement of the sleeve 54 to the left in Fig. 1 thereby shifting the rod 23 to the left through the linkage described and so operating to cause engagement between the driving member of the drive and the engine member. When the engine operates on its own power the driving member will be automatically demeshed by reason of the formation of the clutch jaws 16 and 17 and the screw action between the shaft 13 and its nut 5.

Means may be provided for adjusting the tension of the springs and thereby predetermining the speed at which the engine engagement will occur. As shown in Figs. 9 and 10, such means consists of bell crank shaped pivots 80 which are angularly adjustable and threaded in the non-pivoted ends of the fly-weights and which are held in the adjusted position by nuts 81, the outer ends of the springs 64 being connected with such pivots, as shown in Figs. 9 and 10.

I claim:

1. An engine starting apparatus including a drive having a driving member bodily movable to engage and rotatable to crank a member of the engine to be started, actuating mechanism for rotating said driving member including inertia means, means for operating such mechanism, and speed controlled means operatively associated with said actuating mechanism for controlling the bodily movement of such driving member to cause engagement thereof with the engine member.

2. An engine starting apparatus including a drive having a movable driving member adapted to engage and crank a member of the engine to be started, actuating mechanism therefor including inertia means, means for operating such mechanism, and speed controlled means operatively associated with said actuating mechanism and having operating connections for controlling the engagement movement of such driving member with respect to the engine member.

3. An engine starting apparatus including a drive having a movable driving member adapted to engage and crank a member of the engine to be started, actuating mechanism therefor including inertia means, means for operating such mechanism, and means extraneous to the line of torque-transmission to said driving member and responsive to the speed of such actuating mechanism for controlling the movement of such driving member to cause engagement thereof with the engine member.

4. An engine starting apparatus including a drive having a movable driving member adapted to engage and crank a member of the engine to be started, actuating mechanism therefor including inertia means, means for operating such mechanism, and means responsive to the speed of such mechanism arranged remote from said driving member and having operating connections for controlling the engagement movement of such driving member with respect to the engine member.

5. An engine starting apparatus including a drive having a movable driving member adapted to engage and crank a member of the engine to be started, actuating mechanism therefor including inertia means, means for operating such mechanism, a movable rod operatively connected with said driving member for causing engagement thereof with the engine member, and speed controlled means for controlling the movement of said rod.

6. An engine starting apparatus including a drive having a movable driving member adapted to engage and crank a member of the engine to be started, actuating mechanism therefor, means for operating such mechanism, an axially shiftable rod operatively connected with said driving member for causing engagement thereof with the engine member, and means rotatable with said operating means and movable transversely of its axis of rotation for shifting said rod.

7. An engine starting apparatus including a drive having a movable driving member adapted to engage and crank a member of the engine to be started, actuating mechanism therefor including inertia means and reduction means, means for operating such mechanism, and means responsive to the speed of such reduction means for controlling the movement of such driving member to cause engagement thereof with the engine member.

8. An engine starting apparatus including a drive having a movable driving member shiftable to engage and rotatable to crank a member of the engine to be started, actuating mechanism for rotating said driving member including inertia means and reduction means, means for operating such mechanism, and means responsive to the speed of such reduction means for controlling the shifting movement of such driving member to cause engagement thereof with the engine member.

9. An engine starting apparatus including a drive having a movable driving member adapted to engage and crank a member of the engine to be started, actuating mechanism therefor including inertia means and reduction means including a train of gearing, means for operating such mechanism, and means cooperating with and responsive to the speed of a member of such train of gearing for controlling the movement of such driving member.

10. An engine starting apparatus including a drive having a movable driving member adapted to engage and crank a member of the engine to be started, actuating mechanism therefor including inertia means and reduction means including a gear wheel and its shaft, means for operating such mechanism, and means cooperating with and responsive to the speed of such shaft for controlling the movement of such driving member.

11. An engine starting apparatus including a drive having a movable driving member adapted to engage and crank a member of the engine to be started, actuating mechanism therefor including inertia means, means for operating such mechanism, said driving member having rotary and reciprocating movements, a reciprocating rod connected axially with the driving member for actuating it and means cooperating with said rod for reciprocating the same and the driving member when the speed of the apparatus reaches a predetermined degree.

12. An engine starting apparatus including a drive having a movable driving member adapted to engage and crank a member of the engine to be started, actuating mechanism therefor including inertia means and reduction means, including a rotatable shaft, means for operating such mechanism, and speed responsive means mounted on said shaft and operatively connected with the driving member for controlling the movement thereof.

13. An engine starting apparatus including a drive having a movable driving member adapted to engage and crank a member of the engine to be started, actuating mechanism therefor and reduction means including a rotatable shaft, means for operating such mechanism, and speed responsive means mounted on said shaft and operatively connected with the driving member for controlling the movement thereof, said speed responsive means including a sleeve mounted on the shaft for rotation therewith and longitudinal movement thereon, centrifugally operated weights rotatably connected with said sleeve and cooperating therewith to move it longitudinally when the predetermined shaft speed is reached, and an operating connection between said sleeve and driving member.

14. An engine starting apparatus including a drive having a movable driving member adapted to engage and crank a member of the engine to be started, actuating mechanism therefor and reduction means including a rotatable shaft, means for operating such mechanism, and speed responsive means mounted on said shaft and operatively connected with the driving member for controlling the movement thereof, said speed responsive means including a sleeve threaded onto the shaft, centrifugally operated weights pivoted on said sleeve, and a second sleeve mounted on said shaft and cooperating with said weights.

15. An engine starting apparatus including a drive having a movable driving member adapted to engage and crank a member of the engine to be started, actuating mechanism therefor and reduction means including a rotatable shaft, means for operating such mechanism, and speed responsive means mounted on said shaft and operatively connected with the driving member for controlling the movement thereof, said speed responsive means including a sleeve threaded onto the shaft, centrifugally operated weights pivoted on said sleeve, a second sleeve mounted on said shaft and having a peripheral flange, and pins connecting said flange and weights for rotation but permitting longitudinal movement of such weights and first sleeve.

16. An engine starting apparatus including a drive having a movable driving member adapted to engage and crank a member of the engine to be started, actuating mechanism therefor, means for operating such mechanism, and means responsive to the speed of such mechanism for controlling the engagement and disengagement movements of such driving member with respect to the engine member, and operating connections between the speed responsive means and the driving member capable of shifting the driving member to a position of engagement but incapable of retracting the same.

17. An engine starting apparatus including a drive having a movable driving member adapted to engage and crank a member of the engine to be started, actuating mechanism therefor, means for operating such mechanism, and means responsive to the speed of such mechanism for controlling the engagement and disengagement movements of such driving member with respect to the engine member, and an operating device between the speed responsive means and the driving member capable of shifting the driving member to a position of engagement, and having a lost motion connection to prevent disengagement of the driving member when the speed of said speed responsive means is reduced before the engine starts on its own power.

18. An engine starting apparatus including a driving member shiftable to effect operative connection with and rotatable to crank a member of the engine to be started, actuating mechanism for rotating said driving member including inertia means and reducing gearing operatively connected between said inertia means and said driving member and automatic means for shifting said driving member to cause operative engagement thereof with said engine member including shift-controlling means responsive to the speed of said actuating mechanism, and means for operating said actuating mechanism.

19. An engine starting apparatus including a movable driving member adapted to engage and crank a member of the engine to be started, actuating mechanism therefor, means for operating such actuating mechanism, automatic means responsive to the speed of such actuating mechanism for controlling the movement of such driving member to cause engagement thereof with the engine member, and manually manipulative means also controlling the movement of such driving member to cause engagement thereof with the engine member, said automatic means and manual means being co-related to permit operation of either thereof without interference with the other.

20. In combination, a member adapted to engage and drive a member of an engine be started, the driving member being normally disengaged from the engine member, means including a high speed flywheel for actuating the driving member, and means responsive to the speed of rotation of said flywheel for automatically moving said driving member into engagement with the engine member, whereby driving torque is imparted to the engine member after a predetermined amount of energy is stored in the flywheel.

21. In combination, a member adapted to engage and drive a member of an engine to be started, the driving member being normally disengaged from the engine member, means including a high speed flywheel for actuating the driving member, means responsive to the speed of rotation of said flywheel for automatically moving said driving member into engagement with the engine member, and manually operable means for moving said driving member into engagement with the engine member.

22. An engine starting apparatus including a drive having a movable member adapted, first, to move into mesh with, and then crank a member of the engine to be started, actuating mechanism therefor including a relatively high speed driving element and shaft both of which are rotatable at speeds substantially greater than that of said engine-engaging member, reduction means operatively connecting said shaft with said engine-engaging member, means for operating said actuating mechanism, and means cooperating with and driven from said shaft but distinct from said reduction means for controlling the meshing movement of said engine-engaging member.

RAYMOND P. LANSING.